March 14, 1950  F. J. COZZOLI  2,500,522
SEALING MACHINE

Filed June 20, 1947  2 Sheets-Sheet 1

INVENTOR.
Frank J. Cozzoli
BY
Harold F. Scribner

March 14, 1950 F. J. COZZOLI 2,500,522
SEALING MACHINE
Filed June 20, 1947 2 Sheets-Sheet 2
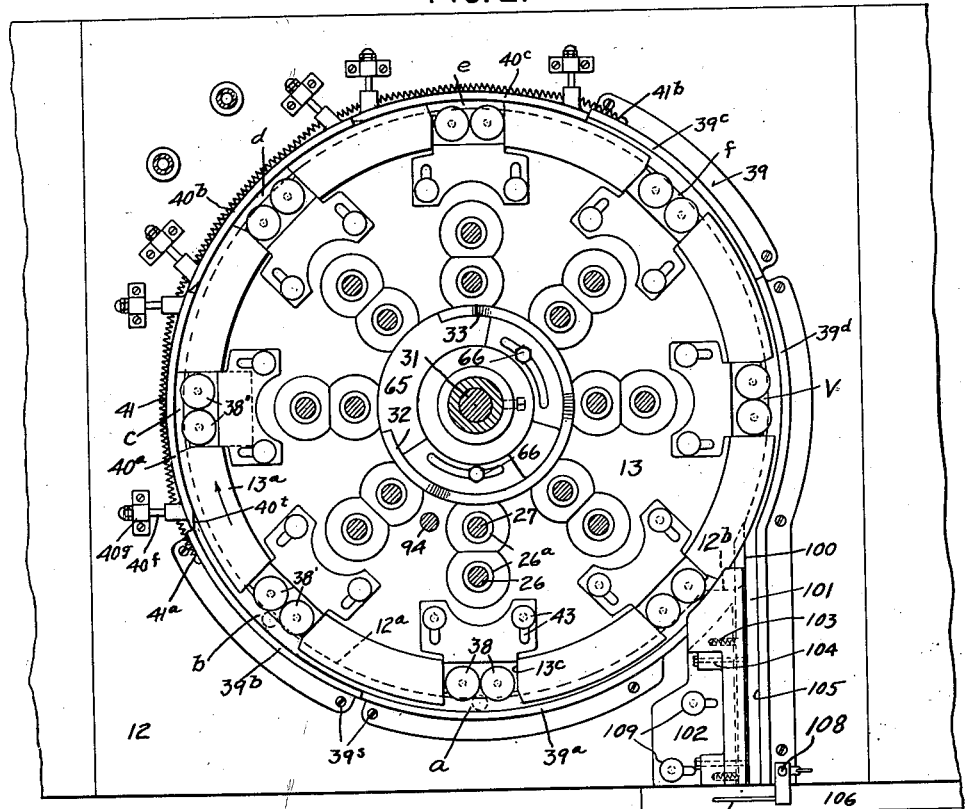
FIG. 2.
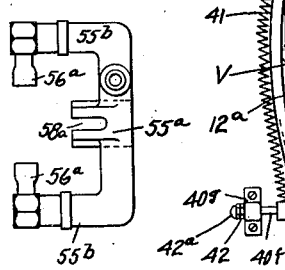
FIG. 7.
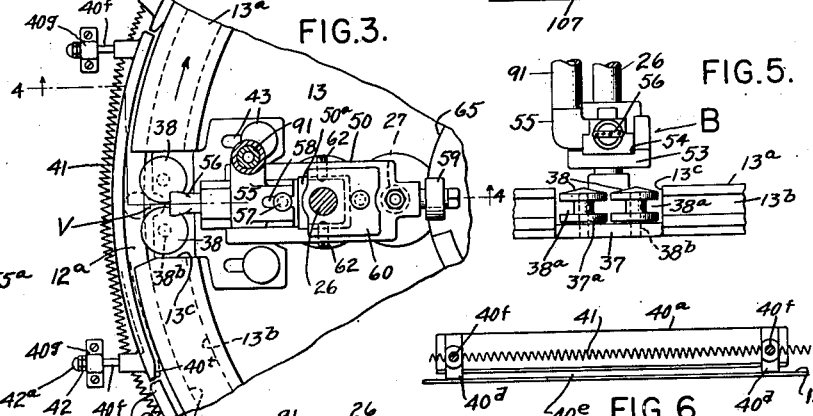
FIG. 3. FIG. 5. FIG. 6. FIG. 4.
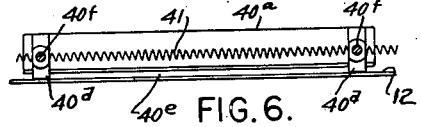
INVENTOR.
Frank J. Cozzoli
BY
Harold F. Scribner Patented Mar. 14, 1950

2,500,522

UNITED STATES PATENT OFFICE 2,500,522

SEALING MACHINE

Frank J. Cozzoli, Plainfield, N. J.

Application June 20, 1947, Serial No. 755,932

16 Claims. (Cl. 49—7)

This invention relates to machines for use in hermetically sealing glass tubes, ampoules and like containers containing a pharmaceutical preparation in liquid, solid, or powder form. More particularly, the invention concerns improvements in the tube carrier and burner mechanisms and their complementing devices and actuating means whereby uniform seals may be expeditiously and properly formed on the containers.

A primary aim of the invention is to render available a machine capable of effecting strong and uniform seals on any of a wide range of ampoule or tube sizes and lengths, and adaptable upon the making of relatively minor adjustments to seal ampoules and tubes outside of the range indicated. A further aim of the invention is to provide a simple and effective means for producing tube rotation at one or more zones or regions of travel of the tube, as for example, at the heating zone or zones, when more than one heating zone is required to effect a particular seal. In my prior Patents #2,379,343, and #2,258,408 a tube carrier embodying rotatable receptacles were employed. However each receptacle was driven by cooperating gears, and arranged for opening and closing to permit insertion and removal of the respective containers. While such mechanisms operated entirely satisfactorily in the performance of their intended functions of supporting and rotating the tubes, they were costly to manufacture and assemble and were subject to fouling if proper attention was not continuously exercised.

In glass working machines of this character great care is taken in the design, to exclude and avoid introduction of foreign particles into the delicate operating mechanisms. However despite such care, small particles, notably fine chips of glass, inevitably find their way into critical locations such as bearings, pivots, teeth of gears, and cause considerable abrasion. Moreover, in the machine sealing of ampoules and tubes containing a pharmaceutical preparation, a weak or defective tube is occasionally encountered and broken in the machine and the preparation, many of which are of a viscous nature, runs over vital regions of the mechanism and soon conditions the machine for general overhaul, cleaning, and possibly repair.

A further aim of the invention is to overcome difficulties of the foregoing nature and to provide a machine embodying a tube receptacle that is capable of effecting tube rotation, at one or more intervals as may be desired, without resort to the use of gears or other delicate driving mechanisms, and a receptacle which, in coaction with other elements of the machine, provides a substantial opening beneath the tube through which liquid, glass particles, dirt, etc. may fall clear of the receptacle and its related mechanisms. A machine constructed in this manner eliminates, in the first instance, the heretofore inherent susceptibility to fouling, and secondly is readily adaptable to simple and easy cleaning without dismantling or withdrawal from service for more than a few moments.

In cooperation with an improved tube holder and method of tube rotating, it is also proposed to render available an improved burner mechanism, the flame tip of which may be brought relatively close to the tube receptacle, to permit sealing of the shortest tubes, and which is adjustable radially of the tube to position the flame the correct distance from the near wall of the tube. Still a further aim is the provision of tube heating means designed and adapted for movement along a line paralleling the tube axis, instead of transversely or arcuately as in the prior machines, in the performance of the sealing operation. By the use of this improved heating mechanism, seals on the shortest tubes and ampoules may be automatically produced with greater uniformity because of the unvarying flame intensity resulting from a direct and straight line movement of the heater.

Still another aim of the invention is to secure properly formed seals on tubes and ampoules at a rapid rate and with means and operable in a manner that insures tube rotation at the heating and sealing zones without effecting discoloration or marking of the container exteriors that would deface printed matter thereon or be an impediment to the performance of subsequent printing procedures. By way of additional improvement the invention undertakes to provide a method and means for effecting tube rotation in a manner requiring a minimum number of parts, so constructed and arranged as to compensate automatically for variations in tube sizes whereby to render the machine capable of handling a run of tubes of any given capacity without manual attention or repeated adjustment. The invention further proposes a tube carrier and receptacle that comprises in part one or more traveling components and one or more relatively stationary components whose conjoint operation performs the functions of tube holding, locating, and centering relative to associated heating and drawing off mechanisms, tube rotation during the heating and sealing stages, tube gripping during the drawing off stage, and a receptacle that admits of ready loading of unsealed tubes and automatic delivery of the sealed tubes in an upstanding position permitting convenient inspection of the finished seals.

In attaining the objectives of this invention it is proposed to construct the tube carrier of stationary and relatively movable parts. One of the stationary parts is preferably made the bottom of the receptacle and arranged to lie in a plane coincident with the table top of the machine, and the movable components are preferably a pair of rolls mounted for free rotation on a movable carrier. The peripheries of the rolls are spaced closely together and form a V near the carrier edge, and opposite the V is positioned a nonshiftable sectional wall which forms the "third" side of the V. The sectional wall, the stationary bottom wall, and the V walls of the laterally movable rolls together form a receptacle adapted to receive and transport the tubes to be sealed. At certain zones along the path of travel of the rollers, the sectional wall is constructed of yieldable sections which operate, as the tube is carried along, to press the tube into the V between the free running rollers. This action not only straightens the tube in the receptacle but the drag of the sectional wall on the periphery of the traveling tube effects rotation of the tube. Preferably, though not necessarily, the roller carrier is made circular, and the length of each yieldable section of the retaining wall is made equal to the spacing of successive pairs of rolls mounted upon the carrier so that only one tube or ampoule engages a given yiedable section at any one time. With this construction assurance is had that each tube regardless of minor variations in diameter is yieldingly urged against the walls of its roll-type V and held thereby properly aligned with its associated burner and upper gripper as the heating, stretching and sealing operations are performed. This clamping action of the sectional wall also insures the holding of the body of the tube down in the receptacle when and as the waste end is drawn off by the upper gripper. Where, as herein disclosed, the upper gripper of the machine is of the non-rotating type, the continued rotation of the body of the tube during the drawing off stage, effects a twisting of the capillary. When twisting is not desired, tube rotation may be suspended as by the provision at the selected region of the tube travel, of a non-yielding outer wall section, or by applying a brake to one or both of the receptacle rolls at the selected region and for the desired period.

Delivery of the sealed tubes is effected by providing an interruption or gate in the non-traveling retaining wall and inserting a delivery finger in the path of travel of the tubes. As the successive tubes arrive at and engage the finger, the curved surface of the trailing roll of each pair functions to cam the sealed tube out of the V and into a normally fixed but adjustable delivery channel. The bottom of the tube receptacles being coincident with the top surface of the machine promotes the action of side delivery without need of auxiliary means to lift the sealed tubes out of the receptacles.

Cooperatively related with each tube receptacle, an improved burner mechanism is provided characterized by straight line vertical mobility and in-and-out burner tip adjustability to suit tube-to-flame proximity and intensity. Preferably also the tip holder of the burner assembly is constructed as a removable unit capable of interchange with other burner tip holders, i. e., single tip holders of different flame capacity or tip holders adapted for twin or cross-fire heating.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which—

Fig. 2 is a plan view of the machine taken along line 2—2 of Fig. 1.

Fig. 3 is an enlarged view of one of the tube receptacles and its co-related burner mechanism.

Fig. 4 is a vertical section view taken substantially along line 4—4 of Fig. 3.

Fig. 5 is a front view of portions of the carrier, one pair of receptacle rolls, and a burner.

Fig. 6 is a front view of one of the yieldable retaining sections.

Fig. 7 is a detail view of an interchangeable twin-fire burner.

Base machine

Figure 1:
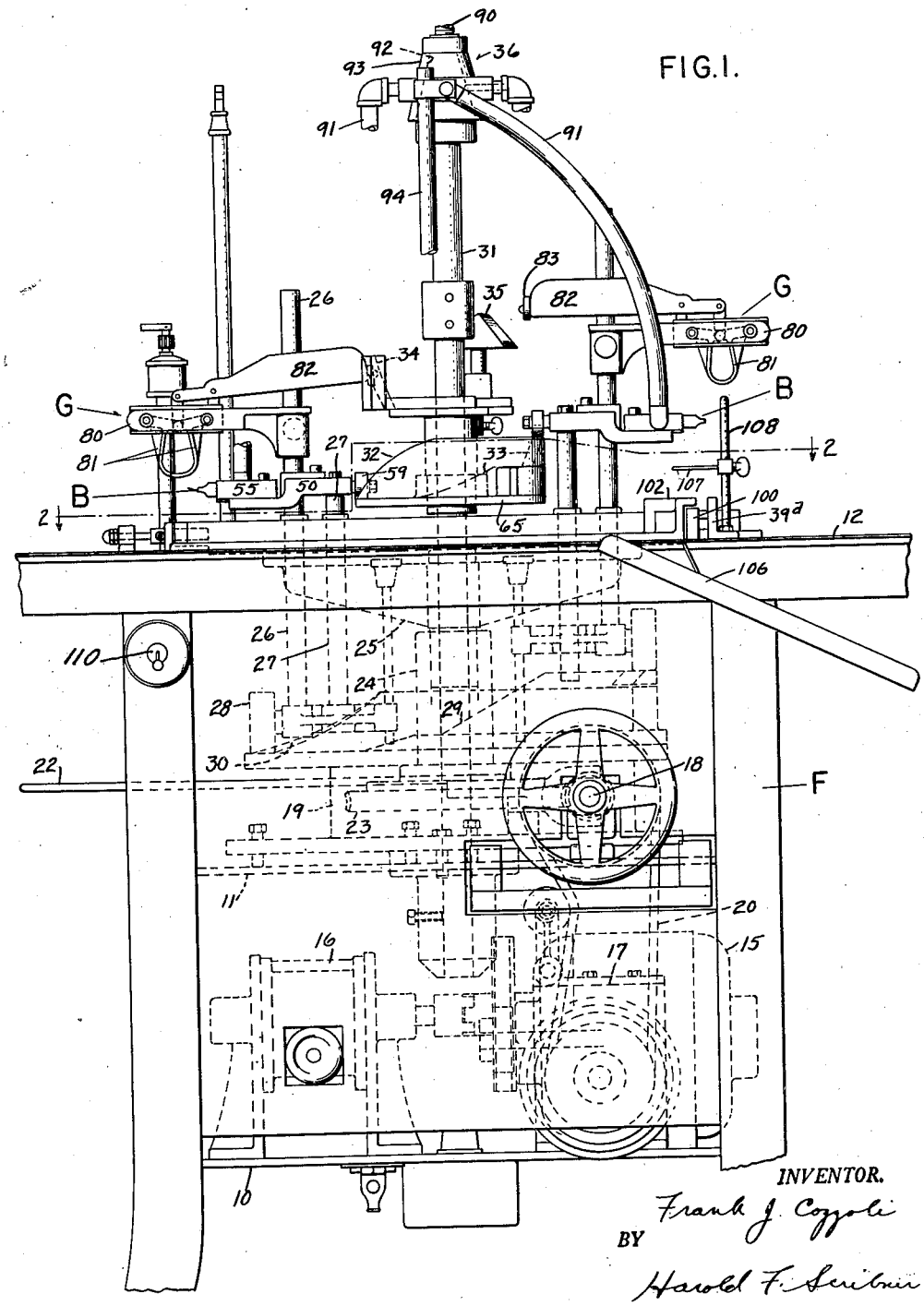
Figure 1 is a front view of a sealing machine embodying this invention, having extended portions thereof deleted, and illustrating but two of the normal complement of eight sealing units.

Referring more particularly to Fig. 1, the sealing machine illustrated, comprises essentially a framed member F which supports transmission platforms 10, 11, and a large work table 12. The central portion of the table 12 is cut away but is overlayed by a rotatable carrier member 13, illustrated more clearly in Figs. 2–4. The drive means for revolving the carrier 13 and for actuating cooperating sealing devices mounted on the carrier, are supported upon the transmission shelves 10 and 11, and as those means may be of the character disclosed in my prior Patent #2,379,343 or application Serial #656,388 filed March 22, 1946, they are, in the interest of clarity, illustrated in Fig. 1 in dotted lines. Briefly the drive mechanism comprises a drive motor 15, which is connected to drive an air pump 16 and a first worm and worm gear speed reducing unit 17. The unit 17 transmits power to a shaft 18 in a secondary worm and worm gear speed reducing unit 19, through a change speed belt and pulley drive indicated at 20. A friction clutch on the shaft 18, controlled by the handle 22, is provided to engage or disengage the drive selectively. The worm gear 23, which forms part of the secondary reduction unit 19, is provided with an upwardly extending sleeve-like hub 24 to which a carrier supporting turret 25 is securely fastened. The turret 25 carries the table or carrier 13.

Gripper rods 26 and burner rods 27 are guided in bushings 26a mounted on the carrier 13 and the former carry at their lower ends rolls 28 that are caused to track gripper raising and lowering cams 29 and 30 respectively that are adjustably mounted upon the cover of the reduction unit 19, in a manner similar to the cams shown in my aforesaid patent application. A non-rotatable shaft 31 is fixedly mounted in the lower casing of the reduction unit 19 and extends upwardly through the turret 25 and carrier 13, and supports thereon adjustable burner actuating cams 32 and 33, gripper jaw actuating cams 34 and 35, and a fuel gas distributor assembly indicated at 36, the latter two mechanisms also being disclosed more fully in my aforesaid application.

*Tube receptacles*

Referring more particularly to Figs. 2, 3 and 4, the rotatable carrier 13 is constructed as a flat disc with a slotted rim 13a. The slot 13b in the rim extends annularly therearound and provides an opening for the reception of a delivery tongue 100 later to be explained. At spaced intervals about the carrier, the rim 13a is provided with openings 13c in which stepped roll carrying plates 37 are adjustably guided and secured. In the present embodiment eight of such roll carrying plates are mounted about the carrier and as all are alike a description of but one will be given. Each plate 37 is formed with a step along its out portions to afford a platform 37a upon which a pair of receptacle rolls 38 are pivotally mounted. As illustrated in Fig. 4, the plane of the roll platform 37a lies above the rim 12a of the table top.

Each of the rolls 38 is formed with an annular groove 38a midway its ends and is mounted for free rotation upon a pin 38b that is pressed in and supported by the roll plate 37. As shown in Figs. 2, 3 and 5, the rolls 38 of each pair of rolls, are positioned with their peripheries close together as to form therebetween an outwardly opening notch indicated at V in drawings. A portion of the table surface 12, namely the rim portion 12a, underlies the V opening and forms the bottom wall of a tube receptacle, and the adjacent portions of the peripheries of the two rolls form two of the vertical side walls of a tube receptacle. The third side wall of the V opening thus constructed is provided by a relatively stationary annular band indicated generally by 39 that is made up of fixed sections 39a, 39b, 39c, and 39d, and yieldable sections 40a, 40b, and 40c. Each of the latter sections are approximately 45° in arcuate length which correspond to the spacing of the respective pairs of rolls 38.

The fixed sections 39a, etc., are fastened to the table top 12 by screws 39s, and their inner surfaces are spaced from the outer rim of the carrier so that the latter does not rub thereon. The sections 40a, etc., rest upon the table top 12 on short legs 40d, whereby a substantial clearance space 40e is provided under the major portions of each section. The yieldable sections 40a, b and c, are restrained against lateral shifting by two parallel guide studs 40f that are axially movable in bearing blocks 40g fastened to the table 12 outwardly from the sections 40a, b, c. Extending about the outer sides of the yieldable sections is a garter spring 41 having its ends 41a, 41b secured to adjacent end portions of the fixed band sections 39b and 39c. Mid portions of the garter spring pass through openings formed in the stud mountings of the yieldable sections and urge each of the yieldable sections 40a, b and c independently inwardly toward the rim of the carrier 13. A jam nut 42 and a cap nut 42a mounted on the outer end of each of the restraining studs 40f are so adjusted that each yielding section may move generally radially inwardly under the action of the spring 41 until its inner vertical face almost touches the rim of the revolvable carrier 13, with a limited amount of oscillatory freedom as may be required in operation.

As will be evident from the drawings, the fixed and yieldable band sections form the third and outer vertical wall of the otherwise open sided V's formed by the respective pairs of rolls 38, 38', etc. The rolls 38 and their respective supporting plates 37 are constructed and adapted for adjustment radially of the carrier as by screw and slot means 43 whereby the open sided V made by the rolls may be adjusted relative to the fixed and movable band sections to accommodate tubes or ampoules of different sizes. The gage point or zone where the adjusting and clamping of the receptacle rolls in position is made preferably at the point marked a in Fig. 2. For gauging purposes the band 39a is secured to the table 12 with its inner face slightly eccentric to the outer margins of the carrier 12, and that the mean or average spacing is at the point a with the gap between the fixed and movable members increasing toward the left and decreasing toward the right of the point a. Hence, any tube or ampoule that is inserted in the receptacle at the loading station which is at or beyond the point a will be loosely held between the radially fixed inner and outer walls of the receptacle as the carrier transports the ampoule from zone a through zone b and on to zone c. At the latter zone the first of the yielding band sections is positioned.

As the ampoule engages the first yielding section 40a, whose leading end is slightly beveled as at 40t, the spring 41 acting through the band 40a, urges the ampoule into the open-sided V and into driving contact with the peripheries of the rolls. The outer side of the ampoule is continuously engaged by the inner face of the band section 40a and as the carrier revolves, the drag of the outer wall on the exterior of the ampoule causes the ampoule to rotate between the rolls about its own axis while it is simultaneously held upright in the receptacle and is carried along in the traveling V. As the ampoule of a given receptacle leaves one of the yielding band sections 40a, b, or c, a succeeding ampoule is entering at the beveled end. Hence not more than one ampoule is engaged by any one yielding section at any one time and in consequence each yieldable section may taken or assume any position in space, within the limits above-mentioned, that is suitable for the particular ampoule that is then traveling along its face. In this way, assurance is had that each ampoule, regardless of small variations in size, may be rotated and simultaneously clamped in its receptacle as it passes through the heating and drawing stages of the sealing operation. Moreover, as the yieldable wall sections 40a, b, c, are respectively held out of actual contact with the rim of the carrier 13, there is no wearing of the surfaces and pick-up by the bands of finely pulverized carrier material such as would become deposited on the ampoule as it is carried along. This is particularly important because ampoules and tubes are placed in the machine for sealing in prewashed and cleaned condition and subsequent tedious cleaning operations are avoided if the sealing machine does not dirty them. In this connection I have found that the best results insofar as insuring tube rotation, cleanliness in finished product, and simplicity of mechanism, is concerned, is to construct the track 12a on which the bottoms of the tubes rest and the rolls 38 of the respective receptacles of stainless steel, and the roll platforms 37, carrier 13, and retaining wall sections 39 of cast aluminum. Materials of this character resist corrosion and may be easily wiped clean in the event of tube breakage. With respect to the latter possibility, the elevated roll platforms 37a, the vertical and lateral gap between them and the inner edge of the track 12a (Fig. 4) and the space 40e provided under each yieldable shoe, afford ample space for glass particles and solutions spilling from a damaged tube to fall and drain away without coming in contact with or fouling any of the tube rotating mechanisms. Should, however, any of the solution be spattered upon the yielding band sections, it may be readily wiped dry and the mechanism restored to use immediately. Belts and bands of rubber, fabric or other composition materials have a tendency to soak up a liquid, and when wet are no longer useful as a driving means for this purpose. On the other hand, a tube receptacle constructed in accordance with this invention, with its characteristic feature of metal-to-glass friction drive, possesses the advantages of simplicity and ease of manufacture and assembling, longevity as to use, and a more-or-less open and accessible type of construction that renders subsequent cleaning a matter of a few moments' time.

Tube heating means

In cooperation with the foregoing explained tube holder, an improved tube heating and sealing burner means and method of operation is proposed. The relation of the burner assembly to other elements of the machine is illustrated in Fig. 1, and its constructional features more in detail in Figs. 3, 4 and 5. Referring to Fig. 4, the burner assembly is indicated generally at B, and comprises a shelf bracket 50 that is secured to the vertically slidable post 27. The post is guided in bushing elements 26a carried by the carrier 13. The forward or extending portion 53 of the bracket is provided with machined ways 54 on which is slidably mounted a burner tip holder 55. The tip holder is interiorly ported for fuel gas and carries at its forward portion a burner tip 56. The tip holder is prevented from twisting on the shelf 53 by the vertical ledges of the ways 54 and is normally clamped tightly to the shelf by screw means 57. The rear portion of the tip holder is slotted as at 58 to permit adjustment of the tip 56 toward or away from the axis of the tube to be sealed which latter is normally radially aligned with the tip as shown by Fig. 3. To the bracket at the opposite side of the post 27 a roller 59, preferably an antifriction bearing, is mounted which in cooperation with the burner lowering and raising cams 32, 33, functions to actuate the burner bracket vertically in parallelism with the axis of a tube positioned in the associated receptacle. While vertical guiding of the burner assembly is achieved by the post 27 and its associated bushing member 26a, angular movement of the burner bracket is restrained by a supplemental guide piece 60 that encircles a gripper rod 26 and is secured to the burner bracket 50 as by a clamp screw 61. The bearing piece 60 is provided with a depending portion that extends into an opening 50a formed in the burner bracket 50. Oppositely acting set screws 62 coacting between the burner bracket and the supplemental guide piece, are provided to center and maintain the burner assembly, more particularly the burner tip 56, properly aligned with the center of the tube to be sealed.

As the sealing operation progresses, the burner is caused to shift vertically along the tube or ampoule axis and this vertical shifting is effected by the normally stationary actuating cams 32 and 33. As the carrier 13 revolves, the burner assemblies revolve therewith, and the roller 59 on each burner assembly (of which there are eight) is caused to engage and track the actuating cams 32, 33, each of which is constructed for adjustment on a cam plate 65. Screw and slot means 66 associated with each cam are provided for that purpose.

In Fig. 7 a burner block 55a for twin fires is disclosed and which is designed as a substitute for the single tip burner block in such cases where higher heats are desired. In this variant form the block 55a is ported and constructed with a base similar to the base described and is adapted for radial adjustment and clamping on the burner shelf 53. In the variant burner, two arms 55b extend forward and carry inwardly directed burner tips 56a. The opposed tips 56a are directed toward the tube axis and develop an intense heat. This arrangement is of especial advantage in producing seals on very large diametered containers.

Upper grippers

The upper tube gripper indicated generally at G, again of which there are eight, one for each tube receptacle, is constructed similar to the gripper of my prior application, and need not be described in detail except to say that each comprises a bracket 80 which supports a pair of radially adjustable jaw elements 81, and a jaw actuating weight 82. The free end of the weight carries a roller 83 that periodically, in the orbital travel of the grippers, engages actuating cams 34 and 35 successively. Each of the gripper brackets 80 is adjustably secured to an associated gripper rod 26 and as the latter is caused to move vertically under the impulse of the cams 29 and 30 in the base of the machine, the gripper assembly is likewise moved vertically. During the revolving movement of the carrier, the roll 83 at the end of each gripper weight is engaged by the relatively stationary cams 34 and 35 and the latter effect a tilting of the weight, which, through its linkage connections with the jaws 81 effect opening and closing of the jaws in proper sequence and in proper phase relation with the various stages of the sealing operation.

Burner fuel, preferably a mixture of gas and air, is led into the distributor 36 at the connection 90 from which it flows through the several burner tubes 91 that are connected to the respective burner blocks 55 or 55a. The distributor herein disclosed is constructed in a manner similar to the distributor of my prior application, and includes a normally stationary conical valve member 92 and a complemental outer casing 93 that is rotated with the carrier 13 by means of an upstanding drive post 94, as in the said application.

Delivery

As the carrier 13 rotates, and the tubes inserted in the receptacles progress through zones b, c, d, e, the sealing operation will have been performed. As each tube leaves the last yielding section 40c it reaches the fixed section 39c where the gap between the section and the carrier is considerably greater and the tube on reaching this gap is no longer clamped against the rolls and rotation stops. Propulsion of the tube along the track continues, however, until the side of the tube engages the delivery tongue 100. The delivery tongue extends outwardly from the rim of the carrier (Fig. 2) and forms one side of a delivery channel 101. Preferably the tongue 100 is mounted on an adjustable bracket 102 and is constructed to have a slight yielding movement relative to the bracket so as to absorb the shock of the tube engagement. Compression springs 103 and limiting screws 104 operatively connecting the tongue 100 with the bracket are provided for this purpose. The forward end of the tongue is reduced in thickness so as to enter the groove 13b in the carrier and the grooves 38a in the respective rolls. Part of the tongue supporting bracket is constructed to over-lay the rim of the carrier and functions as a guard. The wall 105 of the delivery channel opposite the tongue is preferably a continuation of the fixed section 39d and extends parallel to the tongue outwardly away from the carrier. The delivery tongue 100 and the opposed sidewall 105 extend, in this instance, to the front edge of the machine and afford a reservoir of substantial length in which sealed tubes may stand for further cooling and inspection before they are discharged off the edge of the table into an inclined chute 106. To prevent the tubes from falling outwardly on to the chute, an adjustable finger 107 mounted to a post 108 located at the end of the accumulator is provided. This finger extends across the path of travel of the tubes and functions to hold the tubes upright as well as insures that their bottoms will be successively pushed off the table top before tipping over. This arrangement compels each tube to drop bottom-end-down into the delivery chute 106 from whence they may slide into an appropriate basket or box. Knurled thumb screws 109 operating through slots formed in the base of the delivery tongue bracket 102 are provided to clamp the tongue in the proper position relative to the fixed wall 105 in accordance with the size of the tubes being operated upon.

*Operation*

The machine operates as follows: the operator having previously adjusted and clamped the respective sets of rolls 38 for the size tubes to be sealed, and made corresponding adjustment to the delivery tongue bracket, starts the machine with the switch 110 and engages the drive with clutch lever 22. The burner actuating cams 32 and 33, as well as the gripper elevating cams 29 and 30, and gripper jaw actuating cams 34 and 35, will, it will be understood, likewise have been correctly positioned as to phase timing, relation, and height to suit the character and type of seal as well as its location on the tube or ampoule where it is to be performed. With the machine correctly adjusted and the burners lit, the operator places the unsealed tubes successively in the V openings between the rolls 38 and the stationary section 39a as the carrier revolves. This loading zone will usually be between the points marked a and b in Fig. 2, and the ampoules will stand somewhat loosely in their respective sockets, but not so loose as to fall over or to fail to be moved along the track for the reason that the tube receptacles are constructed of sufficient depth to prevent such happenings.

As the tube of any one receptacle reaches the first of the yielding sections 40a, the tube is pressed against the roller and centered thereby. Simultaneously tube rotation starts. At or about the same time the associated burner assembly is lowered with the flame on and heating and softening of the glass starts. Meanwhile, the rotating tube and its burner is traveling laterally with the carrier and as the tube reaches the zone d the gripper assembly G is caused to lower, with the jaws open, over the upper end of the tube. The lowering and opening of the gripper jaws is brought about by the action of the cams 30 and 34 which are relatively timed so that the gripper rod 26 lowers slightly ahead of the weighted end of the jaw operating lever 82. The toggle action within the gripper operates under such conditions to swing the jaws 81 open. As the assembly revolves the weight 82 rides off the cam 34 and the jaws are caused to close on the tube. At this time the ascending portion of the gripper elevating cam is reached by the roll 28 and the gripper starts elevating. That part of the tube that is caught in the gripper jaws is drawn upwardly while the lower part of the tube is held in the receptacle, and the softened glass, at the point where the burner flame had been acting, is drawn out. In the absence of provision for suspending tube rotation during the drawing out stage as previously indicated, continued rotation of the tube body produces a twist in the drawn out capillary. During the drawing out operation the burner is caused, by the cam 33, to rise slowly along the tube axis and finally cuts off and finishes the seal on the ampoule. This occurs in the region C on Fig. 2. Should it be desired to suspend tube rotation at one or more regions of the sealing operation, a roll brake constructed in a manner similar to the device illustrated in my prior Patent #2,379,343, may be provided and arranged so that the lever presses on at least one of the rolls of the present receptacle. The actuating cam and the roll engaging levers may, of course, be mounted above the table 13 if desired.

Following the finishing of the seal further rotary movement of the carrier, brings the tube to the gap afforded by the outward spacing of the fixed guide 39a whereat rotation of the tube ceases and it is merely transported along the track 12a, in a cooling off status, until it is taken out of the carrier by the action of the delivery tongue 100. During this latter portion of the travel of the carrier, the gripper weight 82 engages the inverted V cam 35, which rocks the lever 82 about its pivotal axis and opens the jaws 81. The waste end of the tube is thus released and caused to fall into a waste discharge chute (not shown). Also the burner assembly B is further elevated, with, if desired, its flame reduced by so constructing the rotary valve distributor 36, and the sealing cycle is in order for repetition. As the articles are transported along the track 12a, they tend continuously to wipe the track clean, and accumulating dirt is caused to be discharged over the inner edge of the track 12a. Any dirt or particles that are carried to the delivery station are caused to discharge through an opening 12b provided in the track at that point. It will be understood that, although the foregoing description of operation is made with reference to one roll receptacle, one burner, and one gripper assembly, there are eight of such groups of associated assemblies in the machine of the present embodiment, and members of each group coact and operate in succession as just explained. However, there are but one set of gripper elevating cams 29 and 30, one set of gripper actuating cams 34 and 35, and one set of burner cams 32 and 33. These groups of operating cams are centrally located and are common to each of the eight groups of sealing instrumentalities.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:

1. In combination a sealing machine having means for heating and sealing a tube by fusion, a movable carrier member, a tube receptacle adapted to support a tube comprising in part a pair of roller elements mounted for free rotation on the carrier member with the roll peripheries in close but non-contacting relation whereby to form an open-sided V notch, and in part a walled member disposed opposite the notch formed by said rollers, and mounted for movement toward and away from the said rollers and forming with the walls of the rollers a three-sided opening adapted to receive and support a tube, a bottom wall for said receptacle on which the lower end of the tube is adapted to rest, and means including said walled member for effecting a clamping of the tube in said receptacle.

2. The combination of claim 1 including means operative to move said carrier whereby to effect movement of said rollers along said walled member thereby to effect rotation of the tube in said receptacle.

3. In combination with a sealing machine having means for heating and sealing a tube by fusion, a tube receptacle adapted to support a tube comprising a pair of laterally moveable roller elements mounted for free rotation on axes fixed relative to each other with the roll peripheries in close but non-contacting relation whereby forming an open-sided V notch, a walled member disposed opposite the V notch formed by said rollers and extending at a tangent to the peripheries of both rollers as to form with the peripheries of the rollers a three-sided opening adapted to receive and support a tube, a bottom wall for said receptacle, means operatively connected with said pair of rollers for moving the pair of rollers along said walled member and bottom wall, and means normally operative to urge said walled member toward said pair of rollers to effect simultaneous clamping and rotation of a tube placed therebetween.

4. The combination of claim 3 including means mounting said pair of rollers for bodily movement in a direction normal to the plane of said walled member whereby to provide a receptacle for a tube of a given size.

5. A machine for sealing ampoules or tubes by fusion combining an ampoule carrier comprising in part a pair of roll members positioned with their peripheries in adjacency whereby to form an open sided notch, and in part by a parallel aligned side wall member positioned opposite the notch formed by the roll peripheries, and in part by a bottom wall member underlying said rolls whereby to form a bottom to the receptacle on which to rest a tube, said bottom wall having an opening therein through which foreign matter may fall, means operative to urge said side wall member toward the peripheries of said rolls thereby to effect clamping of an ampoule inserted in the notch therebetween, means operatively connected with one of the elements of said ampoule clamping means for shifting said one element relative to the other thereby to effect rotation of the clamped ampoules; and means for heating the ampoule to effect a seal thereon.

6. The combination in a tube sealing machine of a tube receptacle for supporting a tube at its lower end, said receptacle comprising in part a pair of wide faced and closely spaced roller elements arranged for lateral movement bodily and positioned as to form an open sided V-shaped notch and in part by a series of guide members positioned opposite the V-shaped notch formed by said rollers and which together with said rollers form a triangular shaped opening adapted to receive and transport a tube, means mounting certain of said guide members excluding the first and the last guide member in the series for movement in a direction normal to the direction of roller travel, and resilient means reacting upon said certain movable guide members for urging the said movable members toward said rollers whereby to engage and press against the periphery of a tube positioned therein and effect rotation of the tube during the lateral movement of said rollers.

7. The combination set forth in claim 6 characterized by the provision of limiting means operative on said certain movable guide members to restrain the extent of their movement toward the said rollers.

8. The combination in a sealing machine having means to heat and seal tubes, of a series of tube supporting and transporting means comprising in part a series of laterally movable pairs of rollers, said rollers of each pair being closely positioned as to form a V-shaped open-sided opening, and said means comprising in part a series of movable and non-movable guide sections positioned on a path opposite the open-sided opening formed by said rollers as to form therewith a triangular shaped opening adapted to receive a tube, and yielding means connected with certain of said movable guide sections for urging the said certain sections toward said rollers whereby to effect clamping of a tube in the said opening and simultaneously to create a drag on the outer surface of a tube effective to rotate same as the latter is moved by the rollers laterally along said guide sections, and each of said movable guide sections being of a length substantially equal to the spatial distance between adjacent pairs of rollers so that any one section presses only on one tube effective to rotate same at any one time.

9. The combination in a sealing machine having means to heat and seal a tube, of a tube supporting and transporting means comprising in part a rotatable carrier, a pair of rollers mounted thereon near the periphery thereof, said rollers being positioned as to form an outwardly opening V-shaped notch, a series of non-rotatable metal guide elements positioned exteriorly of the periphery of said rollers and forming therewith a triangular shaped opening adapted to receive a tube, means mounting selected ones of said metal guide elements for movement toward and away from the peripheries of said rollers, and resilient means connected with the said movable guide elements for urging the said elements toward said rollers whereby to create a drag on the outer surface of a tube as the latter is propelled by the rollers along said guide elements.

10. The combination set forth in claim 9 in which selected ones of said non-rotatable guide elements have each an effective length substantially equal to the spacing of the pairs of rollers on the carrier so that but one ampoule receptacle is traversing a yielding guide at any one time.

11. A machine for sealing ampoules or tubes by fusion combining an annularly grooved rotatable carrier mounted for rotation about a vertical axis; a pair of annularly grooved roll members mounted thereon also on a vertical axis and positioned with their grooves in the plane of the annular groove in the carrier and their peripheries in adjacency whereby to form an open-sided notch, a vertically disposed retaining wall disposed exteriorly of said carrier and roll members as to form an outer wall to said open-sided notch, said rollers and outer wall forming a triangular shaped tube receiving receptacle, means to propel said carrier thereby to transport a tube placed in the receptacle from a loading station through a sealing station and thence to a delivery station, a vertically movable burner platform operatively associated with said receptacle a burner block member carried by said platform and equipped with means adapted to heat and seal a tube positioned in the receptacle, and means at the delivery station comprising a tongue member operative in the grooves formed in said carrier and roll members for removing the sealed tube laterally from the notch between said roll members.

12. The combination of claim 11 in which said burner block member is equipped with twin fire producing means.

13. A tube holding and rotating means comprising a pair of freely rotatable, laterally shiftable metal rollers mounted upon axes arranged in tandem with respect to the direction of shift and with their peripheries in close proximity but out of contact, means operative to shift said rollers bodily along a definite path, a metal wall member positioned opposite the V opening formed between the adjacent peripheries of said rollers whereby to form therewith a triangular shaped tube receiving opening therebetween, means mounting a portion of said wall member for movement in a direction normal to the path of shift of the said pair of rollers, yieldable means operative on said movable wall portion tending normally to urge the said wall portion toward the rollers and against a tube inserted in the triangular opening, whereby the inserted tube is caused yieldingly to be pressed against the peripheries of the said rollers and simultaneously rotated in consequence of the drag imposed thereon by the movable portion of said wall member.

14. The combination set forth in claim 13 including means operative on said movable portion of said wall member to limit the extent of movement thereof toward said rollers.

15. The combination set forth in claim 13 including means for adjusting the effective size of the triangular shaped tube receiving opening formed by the walls of said pair of rollers and wall member.

16. A tube carrier for a sealing machine adapted to support and transport a tube to be sealed from a loading station on the machine to a delivery station, comprising a revolvable plate member having an upstanding peripheral rim portion, said rim portion being provided with recesses adapted to receive and guide tube supporting means, a holder member mounted on said plate member adjacent each of the recesses thereof as to project into the said recess, a pair of roller members mounted for free rotation on each of said holder members with the axes of the pair of rollers spaced circumferentially and so that the peripheries of the rollers of each pair clear one another, a yieldable retaining wall member positioned in close proximity to said revolvable plate member but out of contact therewith, said wall member and adjacent peripheries of each of said pairs of rollers defining a triangular shaped opening adapted to receive and support a tube, and means for rotating said plate member relative to said wall member thereby to rotate and transport tubes inserted in the triangular shaped openings from the loading station to a delivery station, and means at the delivery station engageable by the respective tubes for removing the tubes from the said openings.

FRANK J. COZZOLI.

REFERENCES CITED

The following references are of record in the file of this patent:

UNITED STATES PATENTS

| Number | Name | Date |
| --- | --- | --- |
| 1,862,821 | Henderson | June 14, 1932 |
| 2,209,252 | Stewart et al. | July 23, 1940 |
| 2,258,408 | Cozzoli | Oct. 7, 1941 |
| 2,282,993 | Dichter | May 12, 1942 |
| 2,379,343 | Cozzoli | June 26, 1945 |

FOREIGN PATENTS

| Number | Country | Date |
| --- | --- | --- |
| 671,056 | Germany | Jan. 30, 1939 |